United States Patent [19]

Hope et al.

[11] 4,130,385
[45] Dec. 19, 1978

[54] STRIP STRAIGHTENING APPARATUS

[76] Inventors: Henry F. Hope, 3192 Huntingdon Rd., Huntingdon Valley, Pa.; Stephen F. Hope, 2548 Wyandotte Rd., Willow Grove, Pa. 19090

[21] Appl. No.: 692,196

[22] Filed: Jun. 2, 1976

Related U.S. Application Data

[62] Division of Ser. No. 530,685, Dec. 9, 1974, Pat. No. 3,966,868.

[51] Int. Cl.² .................................... B29C 17/02
[52] U.S. Cl. .............................. 425/136; 425/156; 425/396; 425/369; 425/367; 264/286; 96/78
[58] Field of Search ............... 425/136, 156, 140, 396, 425/369, 367, 351.4; 96/48 R, 78; 264/286

[56] References Cited

U.S. PATENT DOCUMENTS

| | | | |
|---|---|---|---|
| 910,790 | 1/1909 | Dahly | 425/369 X |
| 1,420,060 | 6/1922 | Rubin | 425/369 |
| 1,587,462 | 6/1926 | Adams et al. | 264/324 X |
| 1,748,389 | 2/1930 | Marcel | 425/369 X |
| 2,105,238 | 1/1938 | Wittel | 96/78 X |
| 2,114,187 | 4/1938 | Howell | 96/78 |
| 2,484,712 | 10/1949 | Jobst | 425/136 |
| 3,256,566 | 6/1966 | Campbell | 425/367 X |
| 3,292,208 | 12/1966 | Wood | 425/367 |
| 3,419,937 | 1/1969 | Bally | 425/369 |
| 3,438,837 | 4/1969 | Travis | 425/136 |
| 3,635,609 | 1/1972 | Balamuth | 425/396 X |
| 4,021,179 | 5/1977 | Pira et al. | 425/369 |

Primary Examiner—Robert L. Spicer, Jr.
Attorney, Agent, or Firm—Weiser, Stapler & Spivak

[57] ABSTRACT

The invention relates to the processing of photographic material such as photographic film which has a tendency to curl in roller type photographic processing equipment, without attaching a separate leader portion to the film. After removing the curl from an end portion of the film, it is processed in a roller type photographic processing equipment without curling around the transporting rollers.

The invention also provides a method of making this leaderless processing possible. This is performed by deforming a portion of the photographic material so as to prevent the tendency to curl to allow positive self-leading through the roller type processing equipment. Another embodiment of the invention provides a one-piece, partially curled, photographic material wherein curl has been removed from a portion, thus making the film suitable for photographic processing equipment.

Another embodiment provides an apparatus for preventing curl in a portion of photographic material.

43 Claims, 14 Drawing Figures

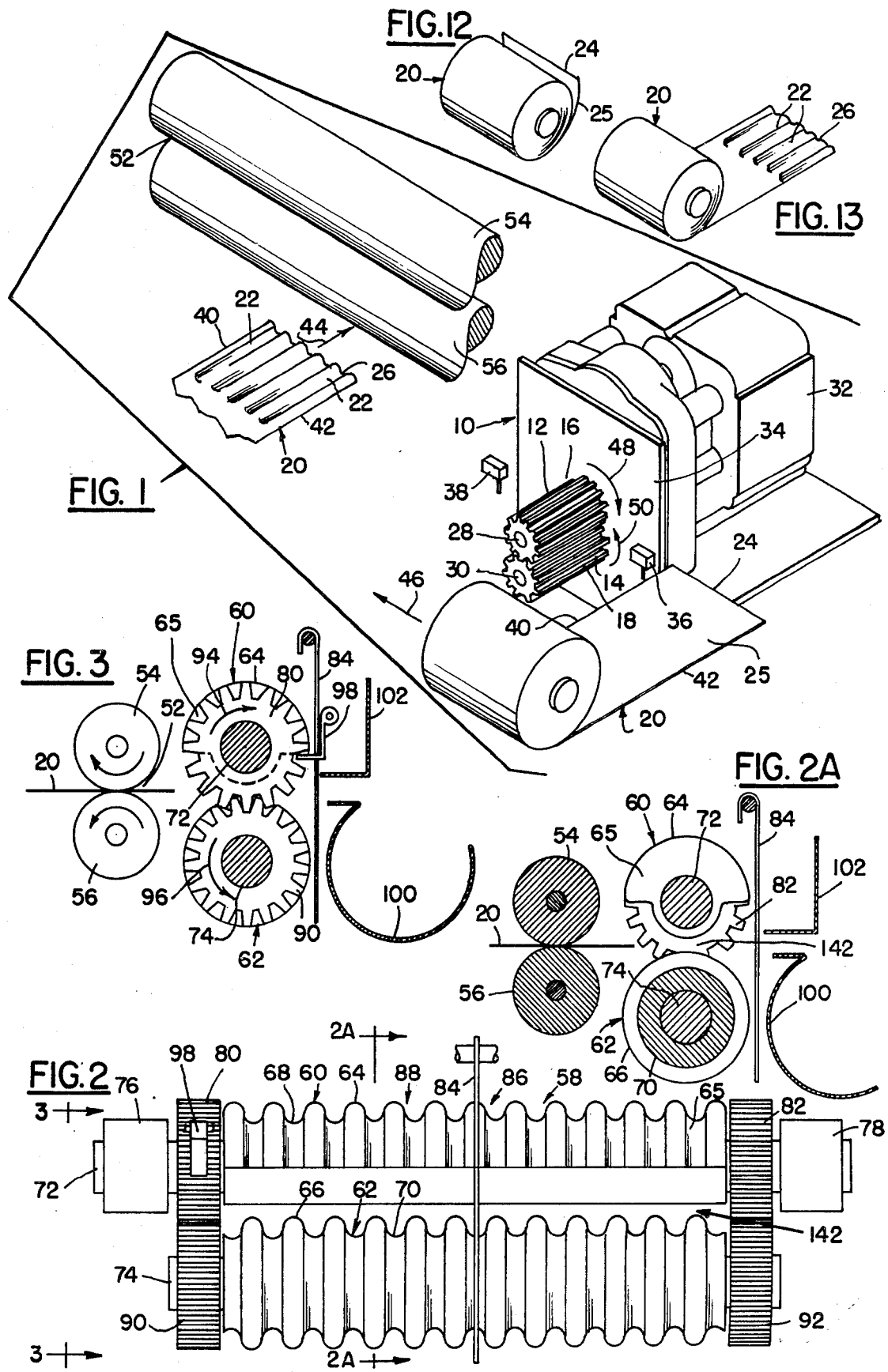

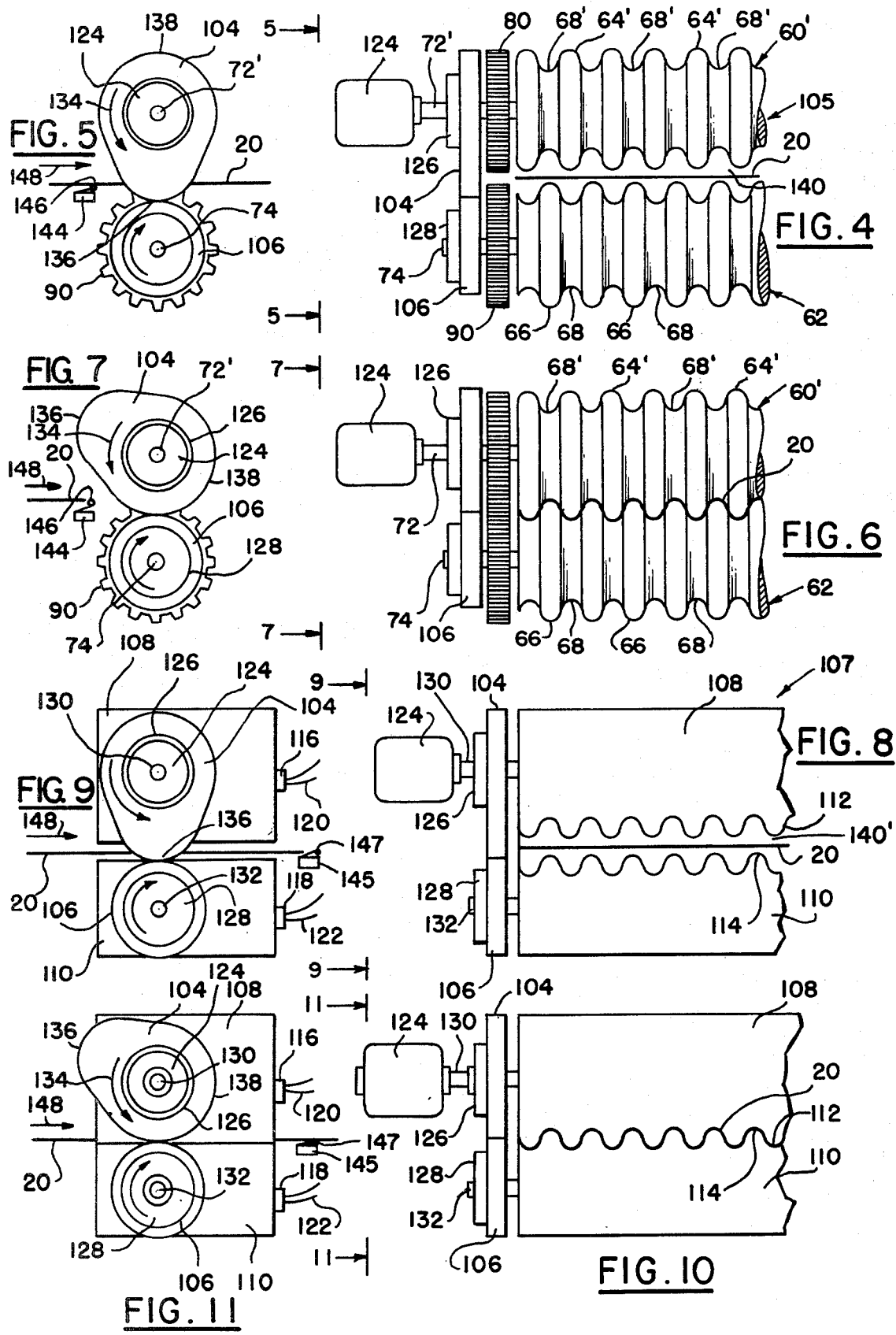

STRIP STRAIGHTENING APPARATUS

This is a division of application Ser. No. 530,685 filed Dec. 9, 1974, now U.S. Pat. No. 3,966,868 issued June 29, 1976 to Henry F. Hope and Stephen F. Hope.

BACKGROUND OF THE INVENTION

The present invention relates generally to the field of strip treatment equipment, and more particularly, is directed to a method and apparatus for straightening a portion of the strip relative to the remaining portion of the strip.

It is common practice to store elongate webs of strip material in coiled form for both convenience in handling, compactness in storage and for allowing the material to be played out from the roll in a regulated manner without fear of bending, twisting, crimping or other damage. Such elongate webs are commonly employed in the photographic industry and film both in undeveloped and in developed form is commonly stored in coiled or rolled condition. In the case of photographic film, both for still cameras and for motion picture cameras, film in coiled condition is by far the most popular method of storage.

In the case of the photographic industry, the film is first packed in a roll prior to use. After the rolled film has been exposed in the camera, during the picture taking process, the film is again rolled into some type of container and is then transported to a photographic developing laboratory to develop the exposed film. It has been found that due to the long period of storage of the film in rolled condition, both before exposure and after exposure, a permanent set or coil develops in the film and accordingly, even after the film is removed from its container in the darkroom, it still possesses a natural memory to curl or coil to assume the tightly rolled condition as within the container itself.

It is now common practice to employ automatic film developing equipment in the laboratories in the interest of savings, both in time and in money, during the development process. Most presently available film developing equipment comprises a plurality of juxtaposed liquid containing tanks for storing the developing, fixing and washing liquids through which the exposed film is passed prior to drying. In order to lead the film automatically through the various liquid containing tanks and the drying system, improved film propelling mechanisms have been developed which generally comprise pluralities of rollers designed to automatically lead the film through the apparatus for the complete developing process. It is necessary that the leading edge of the film be straight so that the film can follow the desired path of travel through the various rollers and guides provided to automatically propel and guide the film through the equipment.

Due to the tightly coiled nature of the film as it is applied to the developing machinery, prior workers in the art have found it desirable to provide a straight strip of material at the leading edge of the film to act as a leader to facilitate initial threading through the apparatus. In order to affix the leader to the leading edge of the film, it has been previously necessary to find some suitable method of joining the two strips together such as by employing an adhesive, plastic tape, staples, heat sealing or other mechanical means. Of course, such joining operations must be performed by hand and these operations thereby increase the cost of the developing process due to the manual handling required to affix the leader and the additional cost represented by the material of the leader itself.

Prior workers in the art have encountered difficulties when employing a separate leader in that it was necessary to spend considerable time and effort to train employees to properly affix the leader. Even with such training, due to the fact that the operations had to be performed in the dark room, sometimes the leader was not securely attached or was connected out of longitudinal alignment. Such defects often caused the leader to break or to otherwise disconnect from the film, thereby causing irreparable damage to the film being processed. The separate leaders previously universally in use created other problems in that chemicals had a tendency to collect in the overlap portion between the film and the leader. This caused increased contamination as the film was directed from tank to tank. The prior art methods was further resulted in increased costs due to the time required to remove the leader following the film processing operation. When staples were employed, the staples had to be fabricated of special chemical resistant materials, all at increased cost.

SUMMARY OF THE INVENTION

The present invention relates generally to the field of sheet straightening apparatus, and more particularly, is directed to a method and equipment suitable to straighten a portion of a coiled web and the composite partially coiled and partially straightened product resulting therefrom.

The term "strip" or "web" as herein used is intended and does cover any thin material, irrespective of the composition, like plastic (thermoplastic or thermoset), cellulosic (woven or non-woven articles), synthetic or natural materials, and the like.

The present invention is equally applicable to any process wherein a strip in coiled form is to be introduced to a roller system for treatment purposes. The photographic industry utilized such equipment and the present invention finds immediate application in this field. However, it will be understood that the invention is not limited to such industry and the claims appended hereto should not be so construed.

The web straightening apparatus and product of the present invention includes a pair of cooperating first and second members at least one of which moves relative to the other to receive therebetween a portion of a web or strip of elongate material. The first and second members are provided with cooperating corrugating means which interfit and interact in a manner to press one edge of the web therebetween. The first and second members act upon the web to impress a plurality of permanent longitudinally aligned creases, bends or corrugations therein. The longitudinally aligned corrugations longitudinally straighten the treated portion and act to remove any curl from the treated end of the strip to thereby produce a composite, integral product including the coiled portion and the corrugated or longitudinally creased leading edge. The corrugations or longitudinal creases act as structural beams to thereby longitudinally straighten the treated portion of the web to have a planar configuration in longitudinal section and to have a corrugated or wavy configuration in transverse cross section.

The treated, straightened, corrugated leading edge can then be introduced directly into the intake of automatic web treating equipment, such as photographic developing equipment, without requiring the affixation of an uncoiled leader or similar strip. The straightened section will remain in planar alignment throughout the apparatus and the longitudinal creases or corrugations serve to maintain the leading edge straight from roller to roller and from roller to guide throughout the apparatus to thereby eliminate any tendency of the strip to jam, curl, or otherwise become damaged throughout its path of travel through the apparatus.

It is therefore an object of the present invention to provide a novel method of employing a strip straightening apparatus therefrom.

It is another object of the present invention to provide a novel web straightening apparatus including means to impress longitudinal corrugations in a portion of a coiled strip.

It is another object of the present invention to provide a novel web straightening apparatus suitable to impress an end corrugation on a strip of material, said apparatus including a pair of corrugating impression rollers which are provided with interacting ridges and troughs to impress a plurality of longitudinally aligned creases in the end of the strip.

It is another object of the present invention to provide a novel web straightening apparatus including an upper platen, a lower platen, the upper and lower platens treating a portion of a material strip therebetween to impress a plurality of longitudinally aligned corrugations on the treated portions of the strip.

It is another object of the present invention to provide a novel method of employing a strip straightening apparatus including the steps of feeding a portion of a coiled strip to a strip straightening apparatus, straightening the portion of the strip while maintaining the straightened portion integral with the remainder of the coiled strip. Another novel method comprises introducing the partly coiled and partly straightened strip to an exterior roller containing apparatus.

It is another object of the present invention to provide a novel web straightening apparatus including an upper platen and a lower platen arranged to treat a portion of an elongate strip therebetween wherein one or both of the platens are provided with heating means for heat treating the strip.

It is another object of the present invention to provide a novel web straightening apparatus including an upper corrugated roller, a lower corrugated roller and means to selectively move one roller relative to the other to impress longitudinally aligned creases upon a portion of a strip of material.

It is another object of the present invention to provide the product of web straightening apparatus wherein a portion of the product is in coiled condition and a portion of the product after treatment is in uncoiled or straight condition.

It is another object of the present invention to provide the product of a web straightening apparatus wherein a portion of the product is in coiled condition and wherein the web straightening apparatus impresses a plurality of ridges and valleys in one end of the strip which are aligned with the longitudinal axis of the strip.

It is another object of the present invention to provide a novel web straightening apparatus and product that is simple in design, inexpensive in manufacture and trouble-free when in use.

Other objects and a fuller understanding of the invention will be had by referring to the following description and claims of a preferred embodiment thereof, taken in conjunction with the accompanying drawings, wherein like reference characters refer to similar parts throughout the several views and in which:

BRIEF DESCRIPTION OF THE DRAWINGS

FIG. 1 is a perspective view of one embodiment of a web straightening apparatus constructed in accordance with the present invention.

FIG. 2 is a front elevational view of a first modified type of web straightening apparatus.

FIG. 2A is a cross sectional view taken along Line 2A—2A of FIG. 2, looking in the direction of the arrows.

FIG. 3 is a cross sectional view taken along Line 3—3 of FIG. 2, looking in the direction of the arrows.

FIG. 4 is a partial front elevational view of a second modified type of web straightening apparatus in web receiving position.

FIG. 5 is an end elevational view taken along Line 5—5 of FIG. 4, looking in the direction of the arrows.

FIG. 6 is a front elevational view of the apparatus of FIG. 4, with the rollers shown in web straightening position.

FIG. 7 is an end elevational view taken along Line 7—7 of FIG. 6, looking in the direction of the arrows.

FIG. 8 is a partial front elevational view of a third modified type of web straightening apparatus with the platens shown in web receiving position.

FIG. 9 is an end elevational view taken along Line 9—9 of FIG. 8, looking in the direction of the arrows.

FIG. 10 is a partial, front elevational view of the embodiment of FIG. 8 showing the platens in web straightening position.

FIG. 11 is an end elevational view taken along Line 11—11 of FIG. 10, looking in the direction of the arrows.

FIG. 12 is a perspective view showing a web in coiled condition prior to treatment.

FIG. 13 is a perspective view of the web of FIG. 12 showing the straightened or corrugated leading edge following treatment.

DESCRIPTION OF THE PREFERRED EMBODIMENT OF THE INVENTION

Although specific terms are used in the following description for the sake of clarity, these terms are intended to refer only to the particular structure of our invention selected for illustration in the drawings and are not intended to define or limit the scope of the invention.

Referring now to FIG. 1, we show a web straightening apparatus 10, which includes generally a pair of rollers 12, 14 having intermeshing teeth 16, 18 to receive a portion of an elongate web 20 therebetween in a non-cutting manner. The leading edge 24 of the web 20 is fed transversely through the intermeshing rollers 12, 14 in the direction of the arrow 46 wherein the teeth 16, 18 cooperate to impress a plurality of longitudinally aligned creases or bends 22 in the previously curled leading edge 25 as the web is fed between the rollers.

As hereinbefore indicated, it is common practice to store elongate strips of material, for example, film, in rolled form and storage in this manner impresses a permanent curl or set 25 in the leading edge 24 of the elongate web 20. See FIG. 12. Upon applying the leading edge 24 of the web 20 to the intermeshing teeth of the rollers 12, 14 as illustrated in FIG. 1, a plurality of parallel creases or bends 22 are impressed in the web in longitudinal alignment with the longitudinal axis of the web. The creases act as structural beams or straighteners to form a straight or uncurled leading edge 26 of the web 20, said uncurled leading edge 26 extending in length for a distance equal to the length of the creases 22. It will be noted that the length of the creases 22 is a direct function of the length of the rollers 12, 14 and accordingly, this length may be readily varied as necessary by constructing the rollers 12, 14 of the desired length, for example, approximately one to three inches.

It will be noted that the web 20 may be fabricated of any elongate length of material which can be stored in roll form, for example, photographic film, paper, foil, plastic, sheet metal or any other type of thin, elongate material which can be advantageiously stored in rolled condition prior to treatment by the apparatus of the present invention.

As seen in FIG. 1, the teeth 16, 18 of the respective rollers 12, 14 are peripherally formed in longitudinal alignment with the respective longitudinal axes of the rollers 12, 14, and intermesh to impress longitudinal creases as the web is urged therebetween. The rollers 12, 14 are pinned or otherwise conventionally affixed to the shafts 28, 30. A conventional electric motor 32 or other power source drives one of the shafts 28 or 30 at a predetermined rotational speed. Assuming that the upper shaft 28 as illustrated is the driving shaft, the lower shaft 30 is so positioned and so journalled in the plate 34 to maintain the parallel spacing between the shafts 28, 30 under all conditions of use. As hereinbefore stated, the respective longitudinally aligned teeth 16, 18 of the rollers 12, 14 intermesh so that rotation of the shaft 28 causes simultaneous rotation of its affixed roller 12 and the intermeshing teeth 16, 18 impart simultaneous rotation to the driven roller 14. The curled leading edge 25 of the web 20 is fed transversely into the nip defined between the rollers 12, 14 in the direction of the arrow 46 wherein the intermeshing teeth 16, 18 coact to impress the plurality of longitudinally aligned creases or bends 22 in the leading edge 24 of the web 20. The imposition of the creases or bends 22 creates an uncurled leading edge 26 of length equal approximately to the length of the rollers 12, 14. If desired, a first microswitch 36 or other web sensing device can be placed on the intake side of the rollers 12, 14 to sense presence of the lateral edge 40 of the web 20 to initiate roller operation by activating the motor 32. A second microswitch 38 can be placed on the outlet side of the rollers 12, 14 to sense the passing of the trailing lateral edge 42 of the web 20 as the web exits from the influence of the rollers 12, 14 to thereby de-energize the motor 32. In this manner, the apparatus will not be continuously operating when there is no web being treated by the rollers.

After the creases or bends 22 are impressed in the web 20 to form the uncurled leading edge 26, the web 20 can be moved longitudinally forward in the direction of the arrow 44 to enter the nip 52 formed between the intake rollers 54, 56 which define the inlet of an apparatus to further treat the web 20, for example, an automatic film developing apparatus.

Referring now to FIGS. 2, 2A and 3, we show a first modified embodiment 58 of a web straightening apparatus which includes a first roller 60 and a second roller 62 which are maintained in parallel intermeshing relationship. In this embodiment, the web 20 is fed longitudinally through the apparatus 58 rather than transversely as in the previous embodiment exemplified by the web straightening apparatus 10. The rollers 60, 62 are provided with a plurality of similar, peripheral, transversely spaced, intermeshing teeth 64, 66 which are longitudinally offset from each other by the width of one tooth, whereby the teeth 64 of one roller 60 can enter and roll upon the valleys 70 which are defined between adjacent teeth 66 on the other roller 62. Similarly, the teeth 66 of the roller 62 enter and roll upon the valleys 68 which are defined between adjacent teeth 64 provided in the roller 60. Thus, when a web 20 is fed longitudinally through the rollers 60, 62, a plurality of creases or bends 22 are impressed in the web for web straightening purposes to form an uncurled or straight leading edge 26.

In the embodiment 58 illustrated in FIGS. 2 and 3, the lower roller 62 is conventionally affixed to a shaft 74 for rotational purposes. The upper roller 60 is semi-cylindrical in configuration including a semi-circular toothed or corrugated area 65. When the toothed area is rotated away from contact with the lower roller 62 as shown in FIG. 2, a planar open area or clear space 142 is defined between the rollers 60, 62. A power source (not shown) such as a motor is conventionally connected to a shaft, for example, the shaft 72 for roller rotation purposes. The shaft 72 may be medially split and functions through a pair of laterally spaced clutches 76, 78 which respectively control power input to the endwardly positioned drive gears 80, 82. A stationary barrier 84 is medially positioned relative to the drive shaft 72 and functions to divide the apparatus 58 into a right film treatment area 86 and a left film treatment area 88 to permit the apparatus to simultaneously and independently treat two elongated webs 20. The clutches 76, 78 are independent in operation and are controlled in well known manner to transmit power from the power source (not shown) to either side of the drive shaft 72 when a web 20 is applied for treatment between the respective first and second rollers 60, 62. The clutches 76, 78 function independently of each other so that the rollers 60, 62 in either of the right film treatment area 86 or left film treatment area 88 may be independently operated or optionally, both areas may be simultaneously operated. The clutches 76, 78 are so arranged that they cannot unintentionally unlatch during any period when a web 20 is being treated within the feed rollers 60, 62. Each drive gear 80, 82 meshes with a respective driven gear 90, 92 to thereby rotatively drive the second roller 62 through the medially split lower shaft 74. As best seen in FIG. 3, when a drive gear 80 is rotated in the direction of the arrow 94 through the clutch 76, it will cause rotation of the driven gear 90 in the direction of the arrow 96 to thereby simultaneously rotate the second roller 62. Latches 98 (only one being illustrated) function in conjunction with the clutches 76, 78 to rotate the driving gears 80, 82 when a web 20 is introduced between the first and second rollers 60, 62. Suitable means, such as microswitches (not shown) monitor the introduction and removal of the web 20 to function the latches 98. Means are provided (not shown) to prevent unlatching of the drive gears 80, 82 from their associated clutches 76, 78 at all times when a web 20 is being treated by the respective teeth 64, 66 of the rollers 60, 62.

Following treatment of the web 20 by the rollers 60, 62 to impress a plurality of longitudinally aligned creases or bends 22, the treated leading edge (not illustrated) of the web 20 is introduced to the nip 52 defined between the feed rollers 54, 56 of some type of web treating apparatus, for example, an automatic film processing apparatus. It will be noted that the length of the creases 22 will be equal to the length of rolling contact between the semi-circular teeth 64 of the roller 60 and the circular teeth of the roller 62. Following the impression of the creases 22, the roller 60 is rotated by function of a micro-switch or similar means to the position illustrated in FIG. 2, to define the clear space 142. The remainder of the web 20 can then be fed longitudinally through the space 142 in uncreased condition to the rollers 54, 56. If desired, the web straightening apparatus 58 can be provided with a feed tray 100 which serves to retain a portion of the web 20 in suitable orientation during the leading edge treatment procedure. Additionally, the apparatus can be provided with certain safety features, such as a shield 102 which can be employed to shield exposed portions of the apparatus to prevent injury to the fingers of the operator. In operation, it has been found desirable to function the web straightening apparatus 10 or 58 at a slightly slower speed than the intake speed of the feed rollers 54, 56 to prevent jamming and to provide an orderly flow of material. We have found that a drive relationship of approximately three-quarters to one to be satisfactory for this purpose. Accordingly, if the feed rollers 54, 56 of an existing machine are rotated at a speed of approximately 8.5 rpm, it is then desirable to rotate the intermeshing pairs of first and second rollers 60, 62 or 12, 14 at a rotative speed of approximately 6.5 rpm. In the embodiment 58 illustrated in FIGS. 2 and 3, we prefer to fabricate the first and second rollers 60, 62 to a length of approximately six inches, thereby providing two film treatment areas 86, 88 approximately three inches wide each to readily accommodate webs of the most commonly employed widths.

Referring now to FIGS. 4–7, a third embodiment 105 of a web straightening apparatus is illustrated which is similar in concept to the second embodiment 58 with the exception that modified separation means to intermittently separate the first and second rollers 60', 62 have been incorporated and the first roller 60' is cylindrical in configuration. The roller shaft 72' is illustrated as being powered by a motor 124 which is illustrative of any conventional shaft rotating power source. A cam 104 is affixed to the power shaft 72' and is rotated thereby in the direction of the arrow 134. The cam 104 is designed to maintain the roller teeth 64', 66 of the rollers 60', 62 in intermeshing relationship as shown in FIG. 6 for a preselected period of rolling contact to impress the creases 22 in the web leading edge 24 of a desired length. The cam 104 includes a rise portion 136 or other construction to alternately separate the rollers 60', 62 sufficiently to permit the remainder of the web 20 to pass therebetween without being creased or bent. The lower shaft 74 is equipped with a follower 106 which is maintained in rolling contact with the cam 104. Thus, as the circular portion 138 of the cam 104 rolls upon the follower 106, the shaft 74 and its affixed toothed roller 62 are also rotated. It will be observed from FIGS. 6 and 7 that when the circular cam portion 138 is in rolling contact upon the follower 106, the shafts 72',74 are maintained in close, parallel arrangement and the teeth 64', 66 of the rollers 60', 62 intermesh for web leading edge 24 creasing purposes. When the rise portion 136 of the cam 104 rolls upon the follower 106, the respective shafts 72', 74 are pushed apart as illustrated in FIGS. 4, 5 to define a clear space 140 between the rollers 60', 62.

A micro-switch 144 can be employed to monitor the travel of the web 20 through the apparatus 105. See FIG. 7. The switch arm 146 is contacted by the leading edge of the web 20 as it is urged longitudinally through the apparatus 105 in the direction of the arrow 148. Activation of the micro-switch 144 functions the motor 124 to rotate the cam 104 and the intermeshing rollers 60',62 to impress a plurality of longitudinal creases 22 into the leading edge 24 of the web. The rollers remain in intermeshing relationship during the entire period of contact between the circular portion 138 of the cam and the follower 106 and serve to impress creases 22 into the web leading edge. When the cam 104 is rotated sufficiently to bring the rise portion 136 into contact with the follower 106, the cam serves to separate the shafts 72', 74 and to separate the rollers 60', 62. A horizontal clear space 140 is thus defined between the rollers through which the length of the web can be longitudinally fed in the direction of the arrow 148 without being creased or bent. See FIGS. 4 and 5. In well known manner, the motor 124 can be controlled to stall at the cam high point as illustrated in FIG. 5 to maintain the clear space 140 for passage of the body of the web 20 without being creased. Upon introduction of the next leading edge 24 to the micro-switch 144, the cam 104 will be rotated again to impress creases or bends 24 in the web leading edge as in FIGS. 6 and 7. If desired, heating means 122, 124 can be employed in conjunction with the rollers 60, 62, or 60', 62 in the form of electrical heaters to aid in impressing permanent creases or corrugations 22 in the leading edge 24 of the web 20.

It is contemplated that the pairs of rollers 12, 14, 60, 62, and 60', 62 will be fabricated of hard plastic or of metal suitable to impress the creases 22 in the web 20. As an alternate means of construction, it is within the scope of the invention that only one roller has teeth and valleys formed therein and that the other roller is constructed, shaped or formed of an interacting, relatively resilient material which serves as an impression roller conforming to the configuration of the peripheral of the configuration-giving roller when contact is made. In this manner, the creases 22 are imparted to the web 20 by utilizing one configured roller and one impression roller (not illustrated). When the rollers are separated, the resilient material of the impression roller will, (but need not) return to the original cylindrical form. It is to be noted that depending on the nature and thickness of the strip or web, the product can have one side or surface thereof impressed with the configuration, and not necessarily on both sides. Likewise, the imprint may be of different depth on either side. A semirigid plastic like of polyethylene or an unplasticized plastic can be so manufactured in accordance with the invention.

Referring now to FIGS. 8–11, we show another embodiment 107 of the invention wherein an upper platen 108 is vertically movable relative to a lower platen 110 for web leading edge corrugating purposes. The upper platen 108 terminates downwardly in a plurality of longitudinally aligned teeth 112 and the lower platen 110 terminates upwardly in a plurality of longitudinally aligned teeth 114, the teeth 112, 114 being transversely offset by the width of one tooth for web leading edge corrugating purposes. See FIG. 10. The upper platen 108 is provided with electrical heating means 120 through a conventional insulated connector 116. Similarly, the lower platen can also be provided with electrical heating means 122 through a connector 118, said heating means serving to aid in permanently impressing a plurality of longitudinally aligned creases 22 in the leading web edge 24 to form a straightened leading edge 26. The upper platen 108 is vertically movable relative to the lower platen 110 in a manner similar to the function of the rollers illustrated in FIGS. 4–7. An electric motor 124 or other power source rotates the shaft 130 to turn the cam 104. A shaft 132 extends from the lower platen 110 and carries the follower 106 therein. Usual hubs 126, 128 are provided for stabilization purposes. In operation, the leading edge of the web 20 contacts the arm 147 of the micro-switch 145 to function the motor 124 to rotate the cam 104. The web 20 is fed longitudinally into the open space 140' in the direction of the arrow 148 until the second micro-switch 145 is contacted to start the cam rotation. When the circular cam portion 138 contacts the follower 106 as in FIG. 11, the respective teeth 112, 144 intermesh and with the aid of the heating means 120, 122 impress a plurality of longitudinally aligned creases, bends or corrugations 22 into the web. The cam continues to rotate until a stall point is reached (FIG. 9) wherein the high rise portion 136 pushes against the follower to raise the upper platen 108 sufficiently to define a clear space 140' above the lower platen 110. The remainder of the web 20 can then be fed through the apparatus 107 in uncreased condition to enter the rollers 54, 56 of additional equipment as hereinbefore more fully set forth. Introduction of a new web 20 to the micro-switch 145 repeats the cycle of operation.

In accordance with the invention, the strip straightening apparatus and process also contemplates the use of any other configuration imparting means other than the wheels or platens disclosed. For instance, there could be used non-cutting shear-like means wherein at least one such shear surface has corrugations or other configuration imparting shape. Likewise, the configuration imparting means could be a simple folding means imparting a fold into the end of the strip. Thus broadly, the apparatus comprises at least one, generally a pair, of configuration imparting means which are contacted with the selected end of the strip for a period of time adequate to impart at least to the one side (surface) of the strip the desired configuration. If desired, heat can be applied concurrently with the pressure.

It is noteworthy that the particular configuration imparted to the strip need not be the preferred grooves and ridges illustrated herein. First, these ridges need not be continuous. They can be non-continuous or disconnected so that some or all of the ridges will be like a series of caterpillar feet. They can be aligned or they can be in an opposite position respective of each other so that the configuration giving means can assume the configuration of a checkerboard wherein the squares are the protrusions and/or the valleys. Of course, they need not be in squares but can be in any other configuration like circles. Another configuration which the configuration means can have is a herringbone like or a weaving type or any other that may be desired.

It is also noteworthy that in accordance with the invention the configuration imparting means can be one of the rotary type such as a wheel and the other of a platen or plate like type as illustrated. Either one of these means can be motionless or in motion during the operation.

Although we have described our invention with a certain degree of particularity, it is understood that the present disclosure has been made only by way of example and that numerous changes in the details of construction and the combination and arrangement of parts may be resorted to without departing from the spirit and scope of the invention as herein claimed.

We claim:

1. An apparatus for treating a selected leading portion of a continuous, coiled material having a tendency to curl and adapted to permit the remaining portions of the continuous material to remain unaffected, which comprises
   a pair of deforming means, having two ends, which are adapted to interact with each other to deform the selected leading portion of material; and
   limiting means adjacent one end of the pair of deforming means, adapted to limit the insertion of the selected leading portion of material within, and to guide it between, the pair of deforming means,
   wherein transmission of the material through the deforming means is provided by rotation of the pair of deforming means,
   whereby the pair of deforming means permits a deformation of predetermined length to be impressed into the selected leading portion of the material only.

2. The apparatus of claim 1 wherein the selected leading portion of material is the leading edge.

3. The apparatus of claim 1 wherein the deforming means are corrugating members.

4. The apparatus of claim 1 wherein the deforming means are a pair of corrugating members.

5. The apparatus of claim 3 in which the limiting means are positioned at approximately ninety degrees with respect to the corrugations of the corrugating members.

6. The apparatus of claim 1 in which the limiting means define a guide path for the abutting selected leading portion of the material being inserted between the pair of deforming means.

7. The apparatus of claim 6 wherein the limiting means define a guide path along the input and output sides of the end of the deforming means which is adjacent to the limiting means.

8. The apparatus of claim 6 wherein the limiting means define a guide path along the input or output side of the end of the deforming means which is adjacent to the limiting means.

9. The apparatus of claim 8 wherein the limiting means are at least as wide as the material.

10. The apparatus of claim 1 wherein the limiting means is a plate.

11. The apparatus of claim 1 wherein the deforming means are rollers.

12. The apparatus of claim 1 in which the apparatus comprises heating means.

13. The apparatus of claim 3 in which the corrugations run longitudinally.

14. The apparatus of claim 1 which comprises a strip sensing means positioned on the input side of the deforming means to detect the approach of the selected leading portion of material.

15. The apparatus of claim 1 which comprises a strip sensing means positioned on the output side of the deforming means to detect the completion of the deforming of the selected leading portion of material.

16. In a strip straightening apparatus which is adapted to deform a selected leading portion of a continuous, coiled material which has a tendency to curl and also to allow the remaining portion to pass without deformation, the combination of a pair of deforming means, at least one being movable between a contact position and a non-contact position with the material to deform a selected leading portion of the material; and separating means adapted to move at least one of the pair of deforming means between a non-contact position to a contact position with the material, to deform a selected leading portion of the material upon placement of the material in position between the pair of deforming means, and to then return the deforming means to its non-contact position after deformation of the selected leading portion has been completed, whereby that selected portion of the material only is deformed and its curl prevented, and the remainder of the material is capable of passage between the pair of deforming means without deformation.

17. The apparatus of claim 16 wherein the selected leading portion is a leading edge.

18. The apparatus of claim 16 wherein the pair of deforming means are rollers.

19. The apparatus of claim 18 wherein the rollers are corrugating.

20. The apparatus of claim 19 wherein the corrugations are at right angles to the axis of the rollers.

21. The apparatus of claim 16 wherein the pair of deforming means are platens.

22. The apparatus of claim 16 wherein the apparatus includes heating means.

23. The apparatus of claim 16 wherein the separating means is a cam.

24. The apparatus of claim 16 wherein at least one of the deforming means has a portion which is not capable of deforming the material.

25. The apparatus of claim 16 comprising timing means to control the pair of deforming means.

26. The apparatus of claim 18 wherein the spacing between the rollers remains constant.

27. The apparatus of claim 16 which comprises a strip sensing means positioned on the input side of the deforming means to initiate operation of the deforming means upon sensing the presence of the material.

28. The apparatus of claim 16 which comprises a strip sensing means positioned on the output side of the deforming means to stop the operation of the deforming means upon sensing that the material is no longer present.

29. The apparatus of claim 1 wherein the pair of deforming means are adapted to deform the full width of the selected leading portion of material.

30. The apparatus of claim 1 wherein the pair of deforming means are in fixed relationship to each other.

31. The apparatus of claim 6 wherein the selected leading portion of material abuts the limiting means at its leading edge.

32. The apparatus of claim 6 wherein the selected leading portion of material abuts the limiting means at it lateral edge.

33. The apparatus of claim 12 wherein heat is applied to the full width of the selected leading portion of material.

34. The apparatus of claim 13 wherein the corrugations run the entire width of the pair of deforming means.

35. The apparatus of claim 16 wherein the pair of deforming means are adapted to deform the full width of the selected leading portion of material.

36. The apparatus of claim 16 wherein the pair of deforming means are adapted to transmit material through the deforming means when in the contact position and to allow it to be freely drawn between the pair of deforming means when in the non-contact position.

37. The apparatus of claim 19 wherein the corrugations run the entire width of the pair of deforming means.

38. The apparatus of claim 22 wherein heat is applied to the full width of the selected leading portion of material.

39. The apparatus of claim 24 wherein the portion which is not capable of deforming the material is perpendicular to the corrugations.

40. The apparatus of claim 39 wherein the portion which is not capable of deforming the material runs the entire width of the deforming means.

41. In a strip straightening apparatus which is adapted to deform only a selected leading portion of a continuous, coiled photographic material to facilitate processing the photographic material through automatic developing equipment, the photographic material having a tendency to curl, and also adapted to allow the remaining portions of material to pass without deformation, the combination of a pair of deforming means, at least one being movable between a contact position and a non-contact position with the material to deform a selected leading portion of the material; and separating means adapted to move at least one of the pair of deforming means between a non-contact position to a contact position with the material, to deform a selected leading portion of the material upon placement of the material in position between the pair of deforming means, and to then return the deforming means to its non-contact position after deformation of the selected leading portion has been completed, a pair of rollers, positioned adjacent to the output side of the pair of deforming means, which are adapted to accept the deformed leading portion of photographic material for direction through the developing machine after the deforming means are returned to the non-contact position, whereby the selected leading portion of photographic material is deformed and its curl prevented to facilitate the developing process, and the remainder of the photographic material is capable of passage between the pair of deforming means without deformation.

42. The apparatus of claim 41 wherein the selected leading portion is a leading edge.

43. The apparatus of claim 41 wherein the deforming means are adapted to transmit photographic material through the deforming means when in the contact position, and to direct it toward the pair of rollers, and to allow it to be freely drawn between the pair of deforming means when in the non-contact position by rotation of the pair of rollers.

* * * * *